(12) United States Patent
Goto et al.

(10) Patent No.: US 11,534,745 B2
(45) Date of Patent: Dec. 27, 2022

(54) HONEYCOMB STRUCTURE

(71) Applicant: NGK Insulators, Ltd., Nagoya (JP)

(72) Inventors: Chika Goto, Nagoya (JP); Shogo Hirose, Nagoya (JP); Tsubasa Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/645,491

(22) Filed: Dec. 22, 2021

(65) Prior Publication Data
US 2022/0314210 A1    Oct. 6, 2022

(30) Foreign Application Priority Data

Mar. 30, 2021 (JP) .............................. JP2021-056726

(51) Int. Cl.
| | |
|---|---|
| *B01J 35/04* | (2006.01) |
| *B01D 46/24* | (2006.01) |
| *B01D 53/94* | (2006.01) |
| *F01N 3/10* | (2006.01) |
| *F01N 3/28* | (2006.01) |
| *F01N 3/20* | (2006.01) |

(52) U.S. Cl.
CPC .............. *B01J 35/04* (2013.01); *B01D 46/247* (2013.01); *B01D 46/2482* (2021.08); *B01D 46/24491* (2021.08); *B01D 53/944* (2013.01); *B01D 53/9431* (2013.01); *B01D 53/9454* (2013.01); *B01D 2255/9155* (2013.01); *B01D 2279/30* (2013.01); *F01N 3/101* (2013.01); *F01N 3/2066* (2013.01); *F01N 3/2839* (2013.01)

(58) Field of Classification Search
CPC .............. B01J 35/04; B01D 46/24491; B01D 46/247; B01D 46/2482; B01D 2255/9155; B01D 2279/30; F01N 3/2066
USPC ......................................................... 422/180
See application file for complete search history.

(56) References Cited

U.S. PATENT DOCUMENTS

| | | | |
|---|---|---|---|
| 8,636,821 B2 * | 1/2014 | Okazaki | B01D 46/24492 55/524 |
| 2007/0259153 A1 * | 11/2007 | Noguchi | F01N 3/0222 428/116 |

(Continued)

FOREIGN PATENT DOCUMENTS

| | | | | |
|---|---|---|---|---|
| JP | 2011-194342 A | 10/2011 | | |
| WO | WO-2011027837 A1 * | 3/2011 | ......... | B01D 39/2068 |

*Primary Examiner* — Tom P Duong
(74) *Attorney, Agent, or Firm* — Burr & Brown, PLLC (57) ABSTRACT

A honeycomb structure includes a pillar-shaped honeycomb structure body having a porous partition wall defining a plurality of cells serving as fluid through channels extending from a first end face to a second end face, and having a circumferential wall disposed so as to encompass the circumference of the partition wall, wherein a thickness of the partition wall is 50 to 132 μm, a porosity of the partition wall is 40 to 55%, an open frontal area of pores on the surface of the partition wall per unit surface area of the partition wall is 10 to 15%, and a percentage ($S_{0\sim10}/S_{all} \times 100\%$) of the ratio of an opening area $S_{0\sim10}$ of the pores having an opening diameter of 10 μm or less to a total opening area $S_{all}$ of the pores opened to the surface of the partition wall is 90% or more.

8 Claims, 3 Drawing Sheets

(56) References Cited

U.S. PATENT DOCUMENTS

2015/0360162 A1* 12/2015 Okazaki ............... C04B 35/195
264/631
2015/0367335 A1* 12/2015 Okazaki .................. B01J 35/10
428/116
2017/0304762 A1* 10/2017 Okazaki .................. F01N 3/022

* cited by examiner

HONEYCOMB STRUCTURE

The present application is an application based on JP 2021-056726 filed on Mar. 30, 2021 with Japan Patent Office, the entire contents of which are incorporated herein by reference.

BACKGROUND OF THE INVENTION

Field of the Invention

The present invention relates to a honeycomb structure. More particularly, it relates to a honeycomb structure which can be particularly suitably utilized as a catalyst carrier for loading a catalyst for exhaust gas purification.

Description of the Related Art

In recent years, society as a whole has become increasingly aware of environmental problems. Therefore, exhaust gas emissions are regulated for gasoline-powered vehicles and diesel-powered vehicles in various countries, and various techniques to remove harmful components such as CO, HC, and NOx have been developed. In removing harmful components in such exhaust gas, it is common to use a catalyst to cause a chemical reaction to the harmful component to be changed into another component which is relatively harmless. For example, as a catalyst for removing harmful components in exhaust gas, an oxidation catalyst, a three-way catalyst, or a selective catalytic reduction catalyst for exhaust gas purification can be used. Then, a honeycomb structure is used as a catalyst carrier for loading a catalyst for such an exhaust gas purification.

Conventionally, as the honeycomb structure, there has been proposed a honeycomb structure including a honeycomb structure body having a porous partition wall for defining a plurality of cells serving as fluid through channels (e.g., see Patent Document 1). The above-mentioned catalyst for exhaust gas purification is loaded (in other words, coated) on such a honeycomb structure to produce an exhaust gas purification device for a gasoline-powered vehicle or a diesel-powered vehicle.

[Patent Document 1] JP-A-2011-194342

SUMMARY OF THE INVENTION

In order to comply with the strict regulations of exhaust gas emission in recent years, the amount of catalyst loaded on the honeycomb structure needs to be increased. However, the conventional honeycomb structure has the following problems when the amount of catalyst loaded increases.

In the conventional honeycomb structure, there has been a problem that a cell serving as a fluid through channel is blocked by catalysts, and pressure loss of the honeycomb structure is increased. Further, there has been a problem that, when a large amount of catalyst is loaded on the surface of the partition wall defining the cell, the catalyst loaded tends to be peeled off from the surface of the partition wall.

Further, since the partition wall constituting the honeycomb structure is formed of a porous material, when the catalyst is loaded on the partition wall, not only the surface of the partition wall but also the inside of the pore of the porous partition wall is filled with the catalyst. Then, when the porosity of the partition wall is increased and the catalyst is filled in the pores in order to increase the amount of catalyst loaded, the diffusivity of the gas using the pore of the partition wall as a path decreases, and thus the catalyst cannot be effectively utilized. For example, when the diffusivity of the gas decreases and the catalyst cannot be effectively utilized, the purification performance of the honeycomb structure obtained by loading the catalyst for exhaust gas purification decreases. Hereafter, increasing the porosity of the partition wall of the honeycomb structure is sometimes referred to as "increasing porosity of the honeycomb structure" or "increasing porosity of the partition wall".

In addition, the honeycomb structure as a catalyst carrier is required to improve the temperature raising performance in order to contribute to the improvement of purification performance at a low temperature. To improve the temperature raising performance of the honeycomb structure, for example, it is considered to reduce the weight of the honeycomb structure by increasing the porosity of the partition wall, or to increase the open frontal area of the cell formed on the honeycomb structure. Hereinafter, increasing the open frontal area of the cell formed on the honeycomb structure is sometimes referred to as "increasing open frontal area" of the honeycomb structure. However, there is a limitation on reducing the weight and increasing open frontal area of the honeycomb structure because the strength of the honeycomb structure is reduced when reducing the weight and increasing open frontal area with respect to the honeycomb structure, and it was sometimes not sufficiently effective against the requirement for improving the temperature raising performance. Furthermore, reducing the weight of the honeycomb structure is accompanied by increasing porosity of the partition wall, and it may also lead to a decrease in purification performance as described above.

The present invention has been made in view of the problems with the prior arts described above. According to the present invention, there is provided a honeycomb structure which can be particularly suitably utilized as a catalyst carrier for loading a catalyst for exhaust gas purification. In particular, the present invention provides a honeycomb structure in which a catalyst loaded on a partition wall is hardly peeled off and the purification performance can be improved.

According to the present invention, there is provided a honeycomb structure to be described below.

[1] A honeycomb structure including: a pillar-shaped honeycomb structure body having a porous partition wall defining a plurality of cells serving as fluid through channels extending from a first end face to a second end face, and having a circumferential wall disposed so as to encompass the circumference of the partition wall, wherein a thickness of the partition wall is 50 to 132 μm, a porosity of the partition wall is 40 to 55%, an open frontal area of pores on the surface of the partition wall per unit surface area of the partition wall is 10 to 15%, and a percentage ($S_{0\sim10}/S_{all}\times100\%$) of the ratio of an opening area $S_{0\sim10}$ of the pores having an opening diameter of 10 μm or less to a total opening area $S_{all}$ of the pores opened to the surface of the partition wall is 90% or more.

[2] The honeycomb structure according to [1], wherein the percentage ($S_{0\sim10}/S_{all}\times100\%$) of the ratio of the opening area $S_{0\sim10}$ of the pores having the opening diameter of 10 μm or less to the total opening area $S_{all}$ of the pores opened to the surface of the partition wall is 94% or more.

[3] The honeycomb structure according to [1] or [2], wherein the percentage ($S_{10\sim20}/S_{all}\times100\%$) of the ratio of the opening area $S_{10\sim20}$ of the pores having the opening diameter of more than 10 μm and 20 μm or less to the total opening area $S_{all}$ of the pores opened to the surface of the partition wall is 6% or less.

[4] The honeycomb structure according to any one of [1] to [3], wherein the percentage ($S_{20-MAX}/S_{all}\times 100\%$) of the ratio of the opening area $S_{20-MAX}$ of the pores having the opening diameter of more than 20 μm to the total opening area $S_{all}$ of the pores opened to the surface of the partition wall is less than 1%.

[5] The honeycomb structure according to any one of [1] to [4], which is a catalyst carrier for loading an oxidation catalyst or a three-way catalyst for exhaust gas purification on the pores of the partition wall.

[6] The honeycomb structure according to any one of [1] to [4], wherein the oxidation catalyst or the three-way catalyst for exhaust gas purification is loaded on the pores of the partition wall, and a filling ratio of the catalyst on the pores is 20 to 35%.

[7] The honeycomb structure according to any one of [1] to [4], which is a catalyst carrier for loading a selective catalytic reduction catalyst for exhaust gas purification on the pores of the partition wall.

[8] The honeycomb structure according to any one of [1] to [4], wherein the selective catalytic reduction catalyst for exhaust gas purification is loaded on the pores of the partition wall, and a filling ratio of the catalyst on the pores is 20 to 35%.

The honeycomb structure of the present invention can be particularly suitably utilized as a catalyst carrier for loading a catalyst for exhaust gas purification, and has an effect that the catalyst loaded on the partition wall is difficult to peel off and the purification performance can be improved. In particular, the honeycomb structure of the present invention is excellent in temperature raising performance and can be expected to improve the purification performance at a low temperature. That is, the honeycomb structure of the present invention can improve the "light-off performance" which is a thermal property in which the purification performance of the catalyst loaded on the honeycomb structure is exhibited.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

Figure 1:
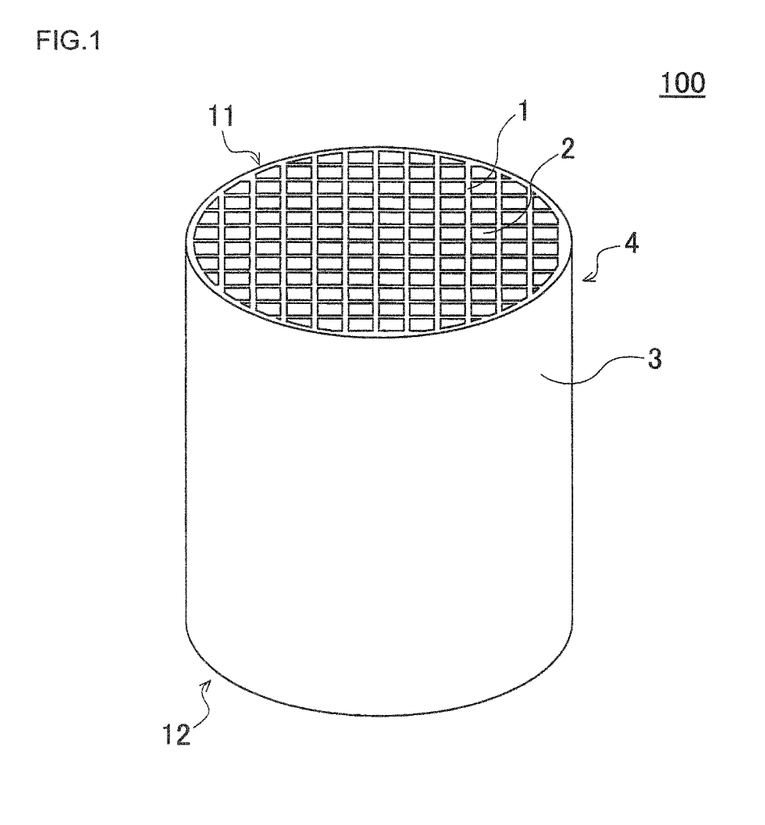
FIG. 1 is a perspective view schematically showing one embodiment of the honeycomb structure of the present invention as viewed from an inflow end face side.
Figure 2:
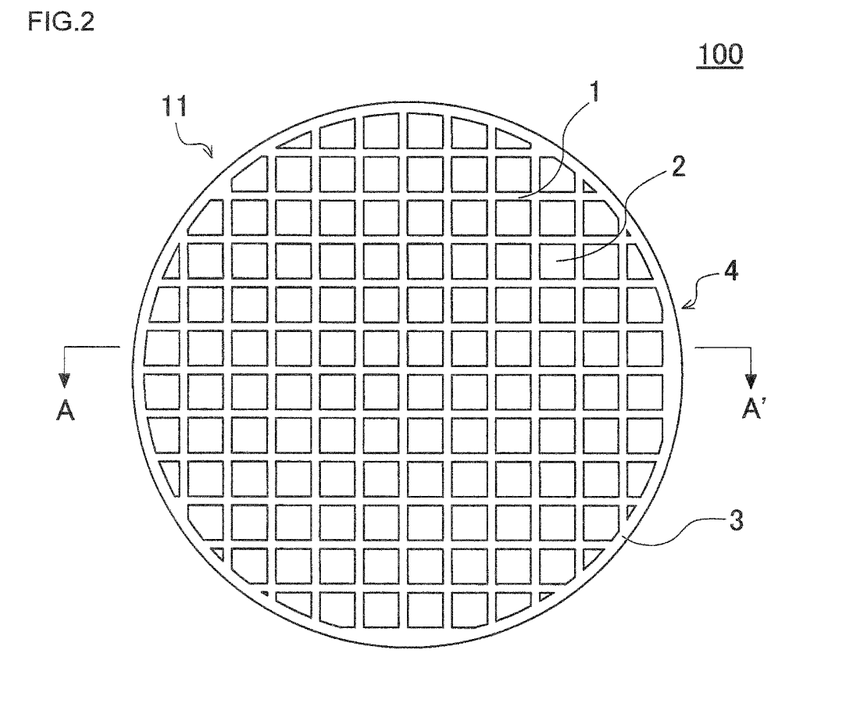
FIG. 2 is a plan view as viewed from the inflow end face of the honeycomb structure shown in FIG. 1.
Figure 3:
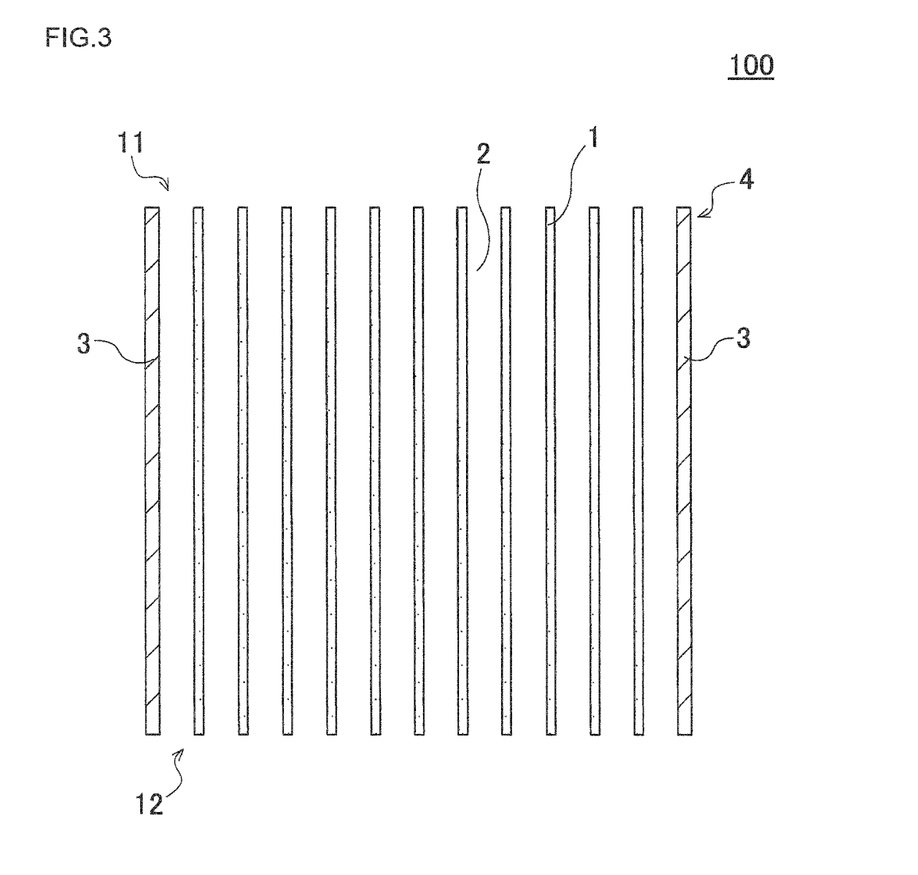
FIG. 3 is a sectional view schematically showing the section taken along the line A-A' of FIG. 2.

(1) Honeycomb Structure:

As shown in FIGS. 1 to 3, a first embodiment of the honeycomb structure of the present invention is a honeycomb structure 100 including a pillar-shaped honeycomb structure body 4. The honeycomb structure body 4 has a porous partition wall 1 defining a plurality of cells 2 serving as a fluid through channel extending from a first end face 11 to a second end face 12, and a circumferential wall 3 disposed so as to encompass the circumference of the partition wall 1.

FIG. 1 is a perspective view schematically showing one embodiment of the honeycomb structure of the present invention as viewed from an inflow end face side. FIG. 2 is a plan view as viewed from the inflow end face of the honeycomb structure shown in FIG. 1. FIG. 3 is a sectional view schematically showing a section taken along the line A-A' of FIG. 2.

The honeycomb structure 100 can be suitably utilized as a purifying member to purify exhaust gas emitted from the engine of automobiles such as a gasoline-powered vehicle or a diesel-powered vehicle. In particular, the honeycomb structure 100 can be suitably utilized as a catalyst carrier for loading a catalyst for exhaust gas purification.

In the honeycomb structure 100, the partition wall 1 constituting the honeycomb structure body 4 is configured as follows. First, a thickness of the partition wall 1 is 50 to 132 μm and a porosity of the partition wall 1 is 40 to 55%. In addition, an open frontal area of pores on the surface of the partition wall 1 per unit surface area of the partition wall 1 is 10 to 15%. Further, a percentage ($S_{0-10}/S_{all}\times 100\%$) of the ratio of an opening area $S_{0-10}$ of pores having an opening diameter of 10 μm or less to a total opening area $S_{all}$ of pores opened to the surface of the partition wall 1 is 90% or more.

The honeycomb structure 100 configured as described above can be particularly suitably utilized as a catalyst carrier for loading a catalyst for exhaust gas purification, and has an effect that the catalyst loaded on the partition wall 1 is difficult to peel off and the purification performance can be improved. In particular, the honeycomb structure 100 of the present embodiment is excellent in temperature raising performance, and it can be expected to improve the purification performance at a low temperature. That is, the honeycomb structure 100 of the present embodiment can improve the light-off performance, which is a thermal property in which the purification performance of the catalyst loaded on the honeycomb structure 100 is exhibited.

As noted above, the thickness of the partition wall 1 is 50 to 132 μm. If the thickness of the partition wall 1 is less than 50 μm, the mechanical strength of the honeycomb structure 100 is lowered. On the other hand, if the thickness of the partition wall 1 exceeds 132 μm, the temperature raising performance of the honeycomb structure 100 is deteriorated. The thickness of the partition wall 1 of the honeycomb structure 100 is not particularly limited, but is preferably 60 to 100 μm, and more preferably 70 to 90 μm. The thickness of the partition wall 1 can be measured with a scanning electron microscope or a microscope, for example.

The porosity of partition wall 1 is 40 to 55%, preferably 47 to 52%, and more preferably 48 to 50%. The porosity of the partition wall 1 is a value measured by mercury press-in method. The porosity of the partition wall 1 can be measured using Autopore 9500 (trade name) manufactured by Micromeritics, for example. The porosity can be measured by cutting out a part of the partition wall 1 from the honeycomb structure 100 to obtain a test piece, and using the test piece thus obtained. If the porosity of the partition wall 1 is less than 40%, the temperature raising performance of the honeycomb structure 100 is deteriorated. On the other hand, if the porosity of the partition wall 1 exceeds 55%, the mechanical strength of the honeycomb structure 100 is lowered.

The open frontal area of pores on the surface of the partition wall 1 per unit surface area of the partition wall 1 is 10 to 15%, preferably 11 to 14%, and more preferably 12 to 13%. The open frontal area of pores on the surface of the partition wall 1 can be measured by the following method. A photograph of the surface of partition wall 1 is taken by the scanning electron microscope (SEM). In the photographed image, the substantial part and the pores of the partition wall 1 are binarized with binarization software to calculate the ratio of each area. The percentage (%) of the ratio of the area of pores to the total area of the surface of the partition wall 1 is the open frontal area (%) of pores on the surface of the partition wall 1. The open frontal area of pores on the surfaces of the partition wall 1 as described above can be measured by cutting out a part of the partition wall 1 from the honeycomb structure 100 to obtain a test piece, and using the test piece thus obtained. If the open frontal area of pores on the surface of the partition wall 1 is less than 10%, the filling ratio of the catalyst on the pores of the partition wall 1 is lowered when the honeycomb structure 100 is used as a catalyst carrier. On the other hand, if the open frontal area of pores on the surface of the partition wall 1 exceeds 15%, the temperature raising performance of the honeycomb structure 100 is deteriorated.

The percentage ($S_{0-10}/S_{all} \times 100\%$) of the ratio of the opening area $S_{0-10}$ of pores having an opening diameter of 10 μm or less to the total opening area $S_{all}$ of pores opened to the surface of the partition wall 1 is 90% or more. Hereinafter, "the percentage ($S_{0-10}/S_{all} \times 100\%$) of the ratio of the opening area $S_{0-10}$ of pores having an opening diameter of 10 μm or less to the total opening area $S_{all}$ of pores opened to the surface of the partition wall 1" may be referred to as "the opening area ratio of pores having an opening diameter of 10 μm or less". When the opening area ratio of pores having an opening diameter of 10 μm or less is less than 90%, the catalyst loaded on the partition wall 1 is difficult to peel off. In addition, the temperature raising performance of the honeycomb structure 100 may be deteriorated, and the purification performance of the catalyst loaded on the honeycomb structure 100 may not be sufficiently exhibited. The opening area ratio of pores having an opening diameter of 10 μm or less is preferably 94% or more. The upper limit of the opening area ratio of pores having an opening diameter of 10 μm or less is not particularly limited, and is, for example, 98% or less. Therefore, for example, the opening area ratio of pores having an opening diameter of 10 μm or less is preferably 90 to 97%, and may be more preferably 94 to 96%. The opening area ratio of pores having an opening diameter of 10 μm or less can be measured by the following methods.

First, the "total opening area $S_{all}$ of pores" and the "opening area $S_{0-10}$ of pores having an opening diameter of 10 μm or less" are measured as follows. A photograph of the surface of the partition wall 1 is taken by the scanning electron microscope (SEM). In the photographed image, the substantial part and the pores of the partition wall 1 are binarized with binarization software to calculate the ratio of each area. A more detailed measurement method is as follows.

First, the honeycomb structure 100 is cut parallel to the extending direction of the cell 2 so that the surface of the partition wall 1 of the honeycomb structure 100 can be observed. Next, the surface of the partition wall 1 is imaged by reflection electrons (annular detector) of a scanning electron microscope "S-3200N (trade name): manufactured by HITACHI". The area for imaging the surface of the partition wall 1 (image processing area) is the surface of the partition wall 1 between the two partition walls 1 erected perpendicular to the surface to be imaged. Such a surface of the partition wall 1 is imaged by the scanning electron microscope (hereinafter also referred to as "SEM") at a magnification of 100 times for a field of view of 20 places in a range of 1200×1000 μm.

Next, the obtained image is binarized by taking the difference between the original image and the smoothed image and using the brightness 20 as a threshold in the difference image. Such a binarization process setting a threshold is sometimes referred to as a dynamic threshold method. This binarization process makes it possible to extract an opening portion (in other words, a void portion on the partition wall 1) of pores in the obtained image. The image after the binarization process is performed as described above is referred to as an "analysis area".

Next, an inscribed circle having a diameter of 10 μm or less is fitted to the "analysis area". At this time, the inscribed circle does not overlap the substantial part of the partition wall 1. When the inscribed circle is fitted, the position of the inscribed circle is specified as coordinates. When an inscribed circle having a diameter of 10 μm or less is fitted, an inscribed circle having a diameter of 10 μm or less and a largest diameter is fitted so that the substantial part of the partition wall 1 and the inscribed circle do not overlap. The diameter of the inscribed circle (that is, the inscribed circle having a diameter of 10 μm or less and a largest diameter) is calculated, and the area of the inscribed circle is calculated from the diameter of the inscribed circle. For the position of the inscribed circle, it is preferable to determine the X coordinate and Y coordinate of the center of the inscribed circle by defining the X-axis and Y-axis in the image. The part (pore) to which the inscribed circle is fitted is defined as a "pore in which an inscribed circle having a largest diameter of 10 μm or less is drawn in the opening area". The "pore in which an inscribed circle having a largest diameter of 10 μm or less is drawn in the opening area" is defined as "pore having an opening diameter of 10 μm or less".

Next, the fitted inscribed circle is further removed from the "analysis area". Thereafter, the inscribed circle having the diameter of 10 μm or less is fitted to the analysis area (the analysis area from which the inscribed circle has been removed) again in the same manner as described above, and when the inscribed circle can be fitted, the coordinates of the position of the inscribed circle are specified, and the area of the inscribed circle is calculated from the diameter of the inscribed circle. The operation is repeated until the "inscribed circle having a diameter of 10 μm or less" is no longer fitted.

Through the above operation, all inscribed circles having a diameter of 10 μm or less among inscribed circles drawn in the pores in the image are obtained, and the area of the inscribed circles obtained is added to calculate the "sum of the areas of inscribed circles having a diameter of 10 μm or less". Then, the calculated "sum of the areas of the inscribed circles having a diameter of 10 μm or less" is the "opening area $S_{0-10}$ of pores having an opening diameter of 10 μm or less".

The "total opening area $S_a u$ of pores" can be calculated from the images subjected to the binarization process described above. Specifically, after the "opening area $S_{0-10}$ of pores having an opening diameter of 10 μm or less" in the "analysis area" is obtained by the above-described methods, the inscribed circle having the diameter of more than 10 μm is fitted to the subsequent "analysis area". The part fitted with the inscribed circle having the diameter of more than 10 μm is referred to as "pore in which an inscribed circle having a largest diameter of more than 10 μm is drawn in the opening area", and the pore is referred to as "pore having an opening diameter of more than 10 μm". When an inscribed circle having a diameter of more than 10 μm is fitted, coordinates of the position of the inscribed circle are specified, and the area of the inscribed circle is calculated from the diameter of the inscribed circle. Next, the fitted inscribed circle is further removed from the "analysis area". Thereafter, an inscribed circle having a diameter of more than 10 μm is fitted to the analysis area (the analysis area from which the inscribed circle has been removed) again in the same manner as described above, and when the inscribed circle can be fitted, the coordinates of the position of the inscribed circle are specified, and the area of the inscribed circle is calculated from the diameter of the inscribed circle. Then, the operation is repeated until the "inscribed circle having a diameter of 10 μm or more" is no longer fitted, and thereafter, an inscribed circle having a diameter of 10 μm or less is fitted to the analysis area (the analysis area from which the inscribed circle is removed), and the operation is repeated until the inscribed circle is not fitted. Through the above operations, all of the inscribed circles drawn in the pores in the images are obtained, and the areas of the inscribed circles obtained are added to calculate the "sum of the areas of pores having an opening diameters of more than 10 μm". The calculated "sum of the areas of the inscribed circles having a diameter of more than 10 μm" is the "opening area $S_{10-MAX}$ of pores having an opening diameter of more than 10 μm". The sum of the "opening area $S_{0-10}$ of pores having an opening diameter of 10 μm or less" calculated as described above and the "opening area $S_{10-MAX}$ of pores having an opening diameter of 10 μm or more" calculated previously is the "total opening area $S_{all}$ of pores". In addition, when calculating the "total opening area $S_{all}$ of pores", for example, by performing the operation of fitting an inscribed circle having a diameter of more than 10 μm and 20 μm or less according to the methods described above, it is possible to calculate the "opening area $S_{10-20}$ of pores having an opening diameter of more than 10 μm and 20 μm or less". Further, it is possible to calculate the "opening area $S_{20-MAX}$ of pores having an opening diameter of more than 20 μm" by performing the operation of fitting an inscribed circle of more than 20 μm to the subsequent "analysis area".

In the honeycomb structure 100, since an opening area ratio in pores having an opening diameter of 10 μm or less is 90% or more, the opening area ratio in pores having an opening diameter of more than 10 μm is 10% or less. Although not particularly limited, a percentage ($S_{10-20}/S_{all}\times 100\%$) of the ratio of the opening area $S_{10-20}$ of pores having an opening diameter of more than 10 μm and 20 μm or less to the total opening area $S_{all}$ of pores opened to the surface of the partition wall 1 is preferably 10% or less, and more preferably 6% or less. With this configuration, the catalyst loaded on the partition wall is more difficult to peel off, and the purification performance can be further improved. Hereinafter, "a percentage ($S_{10-20}/S_{all}\times 100\%$) of the ratio of the opening area $S_{10-20}$ of pores having an opening diameter of more than 10 μm and 20 μm or less to the total opening area $S_{all}$ of pores opened to the surface of the partition wall 1" may be referred to as the "opening area ratio of pores having an opening diameter of 10 to 20 μm".

In addition, a percentage ($S_{20-MAX}/S_{all}\times 100\%$) of the ratio of the opening area $S_{20-MAX}$ of pores having an opening diameter of more than 20 μm to the total opening area $S_{all}$ of pores opened to the surface of the partition wall 1 is preferably less than 1%, and more preferably a value equal to or less than a substantial measuring limit value. With this configuration, the catalyst loaded on the partition wall is more difficult to peel off, and the purification performance can be further improved. Hereinafter, "a percentage ($S_{20-MAX}/S_{all}\times 100\%$) of the ratio of the opening area $S_{20-MAX}$ of pores having an opening diameter of more than 20 μm to the total opening area $S_{all}$ of pores opened to the surface of the partition wall 1" may be referred to as the "opening area ratio of pores having an opening diameter of more than 20 μm".

An average pore diameter of the partition wall 1 is not particularly limited. For example, the average pore diameter of the partition wall 1 is preferably 3 to 12 μm, more preferably 4 to 10 μm, and particularly preferably 5 to 8μm. The average pore diameter of the partition wall 1 is a value measured by a mercury press-in method. The average pore diameter of the partition wall 1 can be measured using Autopore 9500 (trade name) manufactured by Micromeritics, for example. The average pore diameter can be measured using the test piece for measuring porosity described above.

The shape of the cells 2 formed in the honeycomb structure body 4 is not particularly limited. For example, the shapes of the cells 2 in the section orthogonal to the extending direction of the cells 2 may be polygonal, circular, elliptical or the like. Examples of the polygonal shape include a triangle, a quadrangle, a pentagon, a hexagon, and an octagon. The shapes of the cells 2 are preferably triangular, quadrangular, pentagonal, hexagonal or octagonal. In addition, regarding the shapes of the cells 2, all the cells 2 may have the same shape or different shapes. For example, although not shown, quadrangular cells and octagonal cells may be combined. In addition, regarding the sizes of the cells 2, all the cells 2 may have the same size or different sizes. For example, although not shown, some of the plurality of cells may be larger, and other cells may be smaller relatively. In the present invention, the cell 2 refers to a space surrounded by the partition wall 1.

A cell density of the cell 2 defined by the partition wall 1 is not particularly limited. For example, the cell density of the honeycomb structure body 4 is preferably 31 to 93 cells/cm', and more preferably 45 to 62 cells/cm'. If the cell density is too small, the purification performance may be deteriorated when the honeycomb structure 100 is used as a catalyst carrier. On the other hand, if the cell density is too high, pressure loss in use may increase.

The circumferential wall 3 of the honeycomb structure body 4 may be integrally formed with the partition wall 1 or may be a circumferential coating layer formed by applying a circumferential coating material to the circumferential side of the partition wall 1. For example, although not shown, during manufacturing, the partition wall and the circumferential wall may be integrally formed, and then the formed circumferential wall may be removed by a well-known method such as grinding. Then, the circumferential coating layer may be provided on the circumferential side of the partition wall.

A shape of the honeycomb structure body 4 is not particularly limited. The shape of the honeycomb structure body 4 can include a pillar shape in which the shape of the first end face 11 (e.g., the inflow end face) and the second end face 12 (e.g., the outflow end face) is circular, elliptical, polygonal or the like.

The size of the honeycomb structure body 4, for example, the length from the first end face 11 to the second end face 12, and the size of the section orthogonal to the extending direction of the cells 2 of the honeycomb structure body 4 are not particularly limited. The above sizes may be appropriately selected to obtain optimum purification performance when the honeycomb structure 100 is used as a filter for exhaust gas purification.

The material of the partition wall 1 is not limited particularly. Examples of the material of the partition wall 1 include ceramics. More specifically, the materials of the partition wall 1 include cordierite, mullite, alumina, and SiC.

The honeycomb structure 100 may be loaded with a catalyst for exhaust gas purification on the partition wall 1 defining a plurality of cells 2. Loaded with a catalyst on the partition wall 1 refers to coating the catalyst onto the surface of the partition wall 1 and the inner walls of the pores formed in the partition wall 1. With this configuration, CO, NOx, HC and the like in exhaust gas can be turned into harmless substances by catalytic reaction. Examples of the catalyst for exhaust gas purification include an oxidation catalyst, a selective catalytic reduction catalyst, and a three-way catalyst.

Examples of the oxidation catalyst include a catalyst containing a noble metal. Specific examples of the oxidation catalyst include those containing at least one selected from the group consisting of platinum (Pt), palladium (Pd), rhodium (Rh), and the like. When the oxidation catalyst is loaded on the partition wall 1, the loading amount of the oxidation catalyst is preferably 50 to 150 g/L. The loading amount (g/L) of the catalyst is the amount (g) of the catalyst which is loaded per unit volume (1L) of the honeycomb structure body 4.

The three-way catalyst refers to catalysts which purify primarily hydrocarbon (HC), carbon monoxide (CO), and nitrous oxide ($NO_x$). Examples of the three-way catalyst include catalysts containing platinum (Pt), palladium (Pd), and rhodium (Rh). The loading amount of the three-way catalyst is preferably 150 to 300 g/L.

When the oxidation catalyst or the three-way catalyst for exhaust gas purification is loaded on the pores of the partition wall 1, the filling ratio of the catalyst in the pores of the partition wall 1 is preferably 20 to 35%, more preferably 25 to 30%. The filling ratio of the catalyst in the pores of the partition wall 1 can be measured by the following method. A photograph of a section of the partition wall 1 is taken by a scanning electron microscopy (SEM), and in the photographed image, the substantial part and the pores of the partition wall 1, and the catalyst are temarized by imaging software to calculate the ratio of the filled area of the catalyst in the pores of the partition wall 1.

The selective catalytic reduction catalyst is a catalyst that selectively reduce component to be purified. Hereinafter, a selective catalytic reduction catalyst is also referred to as "SCR catalyst". "SCR" is an abbreviation for "Selective Catalytic Reduction". The selective catalytic reduction catalyst is preferably a zeolite-type selective catalytic reduction catalyst or a vanadium-type selective catalytic reduction catalyst. The zeolite-type selective catalytic reduction catalyst refers to a catalyst comprising a catalytically active component containing zeolite. Examples of the zeolite-type selective catalytic reduction catalyst include a selective catalytic reduction catalyst comprising a metal-substituted zeolite. Examples of the metal that metal-substitutes the zeolite include iron (Fe) and copper (Cu). The vanadium-type selective catalytic reduction catalyst refers to a catalyst comprising a catalytically active component containing vanadium. Examples of the vanadium-type selective catalytic reduction catalyst include a catalyst containing vanadium or tungsten as a main component. The loading amount of the selective catalytic reduction catalyst is preferably 100 to 250 g/L.

When the selective catalytic reduction catalyst for exhaust gas purification is loaded on the pores of the partition wall 1, the filling ratio of the catalyst in the pores of the partition wall 1 is preferably 20 to 35%, more preferably 25 to 30%. The filling ratio of the catalyst in the pores of the partition wall 1 can be measured by the measurement method described above.

(2) Manufacturing Method of Honeycomb Structure

The manufacturing method of the honeycomb structure 100 of the present embodiment shown in FIGS. 1 to 3 is not particularly limited. For example, the honeycomb structure is manufactured by the following method. First, a plastic kneaded material is prepared to produce a honeycomb structure body. The kneaded material to produce the honeycomb structure body can be prepared by adding additives, such as binder, pore former and water as needed to a material selected as raw material powder from the aforementioned materials suitable for the honeycomb structure body. Examples of the raw material powder include a cordierite forming raw material. The cordierite forming raw material refers to a raw material which becomes cordierite by firing, specifically, is a raw material which is blended so as to have a chemical composition in which silica is in the range of 42 to 56% by mass, alumina is in the range of 30 to 45% by mass, and magnesia is in the range of 12 to 16% by mass.

Examples of the pore former include a polyacrylic acid-based polymer, starch, polymer compounds such as foamable resin and polymethyl methacrylate (PMMA) resin, and coke. In particular, as the pore former, it is preferable to use a polyacrylic acid-based polymer. Examples of the binder include organic binders such as methylcellulose, hydroxypropoxyl cellulose, hydroxyethylcellulose, carboxy methylcellulose, or polyvinyl alcohol. In particular, as the binder, it is preferable to use methylcellulose and hydroxypropoxyl cellulose together. The surfactant is not particularly limited, and examples thereof include ethylene glycol, dextrin, fatty acid soap, and polyalcohol. These may be used alone or in combination of 2 or more thereof. The content of surfactant is not particularly limited, but is preferably 5 parts by mass or less, more preferably 3 parts by mass or less, and can be, for example, 0.5 to 2 parts by mass, per 100 parts by mass of the cordierite forming raw material.

In the preparation of kneaded material, the porosity of the partition wall can be adjusted by adjusting the addition amount of the pore former. In addition, in order to adjust the open frontal area of the pores on the surface of the partition wall and the opening area ratio of the pores having an opening diameter of 10 µm or less, it is preferable to adjust the particle diameter of the silica of raw material. For example, kneaded material is preferably prepared using silica having the particle diameter of 10 µm or less.

Next, the kneaded material thus obtained is extruded, thereby producing a pillar-shaped honeycomb formed body having a partition wall defining a plurality of cells and a circumferential wall disposed so as to encompass the partition wall.

Next, the obtained honeycomb formed body is dried by microwaves and hot air, for example. Next, the honeycomb formed body is fired to manufacture a honeycomb structure. The firing temperature and the firing atmosphere differ according to the raw material, and those skilled in the art can select the firing temperature and the firing atmosphere that are the most suitable for the selected material. As described above, the honeycomb structure of the present embodiment can be manufactured.

EXAMPLES

The following will describe in more detail the present invention by examples, but the present invention is not at all limited by these examples.

Example 1

For the cordierite forming raw material, talc, kaolin, alumina, aluminum hydroxide, and porous silica were prepared. Note that, for each raw material, talc was 41% by mass, kaolin was 13% by mass, calcined kaolin was 13% by mass, alumina was 12% by mass, aluminum hydroxide was 12% by mass, fused silica was 8% by mass, and crystalline silica was 1% by mass.

Next, kneaded material was prepared by adding 2.2 parts by mass of pore former, 8.0 parts by mass of binder, 1.1 parts by mass of surfactant, and 48 parts by mass of water per 100 parts by mass of cordierite forming raw material. As the pore former, a polyacrylic acid-based polymer was used. As the binder, methylcellulose was used. As the surfactant, ethylene glycol was used.

Next, the obtained kneaded material was molded using an extruder to produce a honeycomb formed body. Next, the obtained honeycomb formed body was subjected to high frequency dielectric heating drying, and then further dried using a hot air dryer. The shape of the cells in the honeycomb formed body was quadrangle.

Next, both end faces of the honeycomb formed body were cut and adjusted to the predetermined size. Next, the dried honeycomb formed body was degreased and fired, so as to obtain a honeycomb structure of Example 1.

The honeycomb structure of Example 1 had a diameter of the end face of 266.7 mm and an overall length in the extending direction of the cells of 101.6 mm, of the honeycomb structure body. The diameters and overall lengths of the honeycomb structure body are shown in Table 1. In the honeycomb structure body of the honeycomb structure, a partition wall thickness was 0.114 mm and a cell density was 62.0 cells/cm$^2$. In addition, a porosity of the partition wall was 45%. Table 1 shows the results. The porosity of the partition wall was measured using Autopore 9500 (trade name) manufactured by Micromeritics. The porosity can be measured by cutting out a part of the partition wall from the honeycomb structure to obtain a test piece, and using the test piece thus obtained. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction.

For the honeycomb structure of Example 1, an open frontal area of pores on the surface of the partition wall per unit surface area of the partition wall was measured in the following manner. The open frontal area of pores on the surface of the partition wall was 13.2%. The results are shown in the column "Open frontal area of pores (%)" in Table 1.

Open frontal area of pores (%) on partition wall surface A photograph of the surface of the partition wall was taken by the scanning electron microscope (SEM). In the photographed image, the substantial part and the pores of the partition wall were binarized with binarization software to calculate the ratio of each area. The percentage (%) of the ratio of the area of pores to the total area of the surface of the partition wall was the open frontal area (%) of pores on the surface of the partition wall.

With respect to the honeycomb structure of Example 1, "Opening area ratio of pores having Opening diameter of 10 µm or less", "Opening area ratio of pores having Opening diameter of 10 to 20 µm," and "Opening area ratio of pores having Opening diameter of more than 20µm" were measured by the following method. The results are shown in Table 1.

(Opening area ratio of pores (%) having Opening diameter of 10 µm or less, Opening area ratio of pores (%) having Opening diameter of 10 to 20 µm, and Opening area ratio of pores (%) having Opening diameter of more than 20 µm) A photograph of the surface of the partition wall was taken by the scanning electron microscopy (SEM), and in the photographed image, the substantial part and the pores of the partition wall were binarized with binarization software to calculate the ratio of each area. In order to calculate the areas of the pores having an opening diameter of 10 µm or less, the pores having an opening diameter of 10 to 20 µm, and the pores having an opening diameter of more than 20 µm, in the imaging analysis, the inscribed circles having diameters corresponding to the respective opening diameters are fitted, and the areas of the inscribed circles were calculated from the diameters of the respective inscribed circles. Specifically, as described in the above-described embodiment, first, the obtained image was binarized by taking the difference between the original image and the smoothed image and using the brightness 20 as a threshold in the difference image to obtain the analysis area. An inscribed circle having a diameter of 10 µm or less, an inscribed circle having a diameter of more than 10 µm and 20 µm or less, and an inscribed circle having a diameter of more than 20 µm were sequentially fitted to the analysis area thus obtained, and the area of each inscribed circle was calculated from the diameter of each inscribed circle. Then, an opening area of the pores having the opening diameter of 10 µm or less, an opening area of the pores having the opening diameter of 10 to 20 µm, and an opening area of the pores having the opening diameter of more than 20 µm were respectively determined, and their ratio (opening area ratio (%)) was calculated.

TABLE 1

| | Honeycomb structure body | | | | | | Opening area ratio of pores (%) | | |
| --- | --- | --- | --- | --- | --- | --- | --- | --- | --- |
| | Diameter (mm) | Overall length (mm) | Partition wall Thickness (mm) | Cell density (cells/cm$^2$) | Porosity (%) | Open frontal area of pores (%) | Opening diameter of 10 µm or less | Opening diameter of 10 to 20 µm | Opening diameter of more than 20 µm |
| Comparative Example 1 | 266.7 | 101.6 | 0.114 | 62.0 | 35 | 9.9 | 80 | 20 | 0 |
| Example 1 | 266.7 | 101.6 | 0.114 | 62.0 | 45 | 13.2 | 94 | 6 | 0 |
| Example 2 | 266.7 | 101.6 | 0.089 | 62.0 | 45 | 13.5 | 94 | 6 | 0 |
| Example 3 | 266.7 | 101.6 | 0.132 | 62.0 | 45 | 13.6 | 94 | 6 | 0 |

TABLE 1-continued

| | Honeycomb structure body | | | | | | Opening area ratio of pores (%) | | |
|---|---|---|---|---|---|---|---|---|---|
| | Diameter (mm) | Overall length (mm) | Partition wall Thickness (mm) | Cell density (cells/cm²) | Porosity (%) | Open frontal area of pores (%) | Opening diameter of 10 µm or less | Opening diameter of 10 to 20 µm | Opening diameter of more than 20 µm |
| Comparative Example 2 | 266.7 | 101.6 | 0.114 | 62.0 | 50 | 13.5 | 17 | 33 | 50 |
| Example 4 | 266.7 | 101.6 | 0.114 | 62.0 | 50 | 12.2 | 90 | 10 | 0 |
| Example 5 | 266.7 | 101.6 | 0.114 | 62.0 | 47 | 13.2 | 91 | 9 | 0 |
| Example 6 | 266.7 | 101.6 | 0.064 | 62.0 | 45 | 13.5 | 94 | 6 | 0 |
| Example 7 | 266.7 | 101.6 | 0.114 | 62.0 | 47 | 13.5 | 91 | 9 | 0 |
| Example 8 | 266.7 | 101.6 | 0.114 | 62.0 | 45 | 13.3 | 90 | 10 | 0 |
| Example 9 | 266.7 | 101.6 | 0.114 | 62.0 | 50 | 13.0 | 92 | 8 | 0 |

Catalyst was loaded on the partition wall of the honeycomb structure of Example 1 by the following method. First, a catalyst slurry containing an oxidation catalyst was prepared. Specifically, a Pt-containing nitric acid solution was added to alumina powder and mixed, and then baked at 400° C. in a furnace. Thereafter, water and an alumina sol were added to the obtained powder to prepare the catalyst slurry. Next, the obtained catalyst slurry was loaded on the honeycomb structure so that the loading amount per unit volume after drying was 100 g/L. To load the catalyst, dipping was performed to the honeycomb structure, and the extra catalyst slurry was blown away with air to impregnate the catalyst slurry. Then, the honeycomb structure was dried at 150° C., and further subjected to heat treatment at 400° C. for 2 hours to obtain a catalyst-loaded honeycomb structure which is loaded with the catalyst. The loading amount of the catalyst loaded on the honeycomb structure of Example 1 is 100 g/L.

For the catalyst-loaded honeycomb structure, loading status of the catalyst was confirmed by SEM. When the loading status of the catalyst with respect to the partition wall is present on the substrate, it is described as "On-wall" in the column of "Catalyst loading status" in Table 2, Further, when the loading status of the catalyst with respect to the partition wall is present in pores, it is described as "In-wall" in the column of "Catalyst loading status" in Table 2.

In addition, a catalyst filling ratio (%) of the partition wall of the catalyst-loaded honeycomb structure was measured as the catalyst area/pore area by obtaining the area by ternarizing of the catalyst, the substrate, and the pores based on the SEM photograph. The measurement results are shown in Table 2.

The catalyst-loaded honeycomb structure was evaluated for "Isostatic strength (MPa)", "HC purification performance (%)", "Light-off performance (1)", "Light-off performance (2)", "PD", "Purification performance after HVT (%)", "Mass after HVT (%)," and "Presence or Absence of catalyst peeling". Each evaluation method is as follows. The results are shown in Table 2.

(Isostatic Strength (MPa))

The measurement of the isostatic strength was performed based on the isostatic breaking strength test specified in M505-87, which is an automobile standard (JASO Standard) issued by Society of Automotive Engineers of Japan, Inc. The breaking strength test is performed by placing a honeycomb structure in a rubber cylindrical container, covering the container with an aluminum plate, and then applying an isostatic pressure thereto in water. That is, the isostatic breaking strength test is a test simulating a compressive loading weight when the honeycomb structure is gripped on the circumferential surface in the can body. The isostatic strength measured by the isostatic breaking strength test is shown by a pressurized pressure value (MPa) when the honeycomb structure is broken. In the evaluation of the isostatic strength, if the value is 1.0 MPa or more, it is considered acceptable.

(HC Purification Performance (%))

In the measurement of the HC purification performance, first, a test gas containing HC was flowed through a catalyst-loaded honeycomb structure which is loaded with the catalyst described above (hereinafter, simply referred to as "catalyst-loaded honeycomb structure"). Thereafter, the NOx content of the exhaust gas emitted from the catalyst-loaded honeycomb structure was analyzed by a gas analyzer. The temperature of the test gas flowing into the catalyst-loaded honeycomb structure was 200° C. The temperatures of the catalyst-loaded honeycomb structure and the test gas were adjusted by a heater. An infrared image furnace was used as the heater. As the test gas, a gas obtained by mixing 300 ppm of HC (propylene 80% and propane 20%), 5% by volume of carbon dioxide, 1000 ppm of carbon monoxide, 8% by volume of oxygen, 1000 ppm of nitric oxide (based on volume), and 5% by volume of water with nitrogen was used. As for the test gas, water and a mix gas mixed with other gases were separately prepared, and these were mixed in a pipe during the test and used. As the gas analyzer, "MEXA9100EGR (trade name)" manufactured by HORIBA, Ltd. was used. The space velocity at which the test gas flowed into the catalyst-loaded honeycomb structure was 120,000 (hr$^{-1}$).

(Light-Off Performance (1))

Exhaust gas was flowed through the catalyst-loaded honeycomb structure in the status of 300° C. until the temperature reached 600° C. by accelerating the engine. At this time, the time (sec) required for the temperature inside the catalyst-loaded honeycomb structure to reach 550° C. was measured, and the time (sec) required for the temperature to reach 550° C. was used as the evaluation result of the light-off performance (1).

(Light-Off Performance (2))

Exhaust gas was flowed through the catalyst-loaded honeycomb structure of each Example until the temperature reached 600° C. by accelerating the engine. At this time, the inside temperature (° C.) was measured. Further, with respect to the catalyst-loaded honeycomb structure of Comparative Example 1 described later, the carrier was heated in the same manner to measure the inside temperature (° C.) thereof. The temperature difference (° C.) between the catalyst-loaded honeycomb structure of each Example and the catalyst-loaded honeycomb structure of Comparative Example 1 was calculated, and the calculated temperature difference (° C.) was used as the evaluation result of the light-off performance (2).

(PD)

PD refers to pressure loss. The PD were evaluated by flowing air through the catalyst-loaded honeycomb structure at a flow rate of 11 m$^3$/minute at room temperature (25° C.). In this state, the pressure difference between the air inflow side and the air outflow side was measured. The pressure difference was calculated as pressure loss.

(Purification Performance after HVT (%))

HVT is a heat vibration test. The evaluation of purification performance after HVT is an evaluation of giving vibration in direction of the flow path of exhaust gas while flowing hot combustion gases through the catalyst loaded honeycomb structure. In the evaluation of purification performance after HVT, if there is no crack before and after the test, it is considered acceptable.

water and washed. The catalyst-loaded honeycomb structure thus washed is removed from the beaker, and moisture adhering to the catalyst-loaded honeycomb structure is removed and then dried at 200° C. for 1 hour. Thereafter, the mass of the dried catalyst-loaded honeycomb structure (mass after evaluation) was measured. The mass after evaluation described above is defined as "mass after evaluation W2". Then, the "reduction rate of mass" of the catalyst-loaded honeycomb structure due to catalyst peeling was calculated by the formula (1) the reduction rate of mass (%)=(W1−W2)/W1×100%, and the presence or absence of catalyst peeling was confirmed by the following evaluation criteria. When the reduction rate of the mass is 1.0% or more, catalyst peeling is determined to be present, and "Presence" is described in the column of "Presence or Absence of catalyst peeling" in Table 2. On the other hand, when the reduction rate of the mass is less than 1.0%, catalyst peeling is determined to be absent, and "Absence" is described in the column of "Presence or Absence of catalyst peeling" in Table 2.

TABLE 2

| | Catalyst loading status | Catalyst filling rate (%) | Isostatic strength (MPa) | HC purification performance (%) | Light off performance (1) *1 (sec) | Light off performance (2) *2 (° C.) | PD | Purification performance after HVT (%) | Mass after HVT (%) | Presence or Absence of catalyst peeling |
|---|---|---|---|---|---|---|---|---|---|---|
| Comparative Example 1 | On-wall | 24 | 4 | 73 | 89 | — | 0.18 | 65 | 1 | Presence |
| Example 1 | On-wall | 28 | 3 | 73 | 85 | 4 | 0.17 | 68 | 1 | Absence |
| Example 2 | On-wall | 28 | 2 | 73 | 80 | 3 | 0.16 | 67 | 1.1 | Absence |
| Example 3 | On-wall | 28 | 4 | 68 | 88 | 1 | 0.2 | 66 | 1.1 | Absence |
| Comparative Example 2 | In-wall | 55 | 2 | 63 | 88 | 2 | 0.103 | 40 | 10 | Absence |
| Example 4 | On-wall | 30 | 2 | 73 | 83 | 6 | 0.17 | 65 | 1.2 | Absence |
| Example 5 | On-wall | 40 | 4 | 68 | 84 | 6 | 0.15 | 66 | 1.3 | Absence |
| Example 6 | On-wall | 28 | 1 | 72 | 86 | 4 | 0.16 | 65 | 1.1 | Absence |
| Example 7 | On-wall | 30 | 2 | 67 | 86 | 5 | 0.17 | 64 | 1.2 | Absence |
| Example 8 | On-wall | 30 | 3 | 65 | 86 | 4 | 0.17 | 67 | 1.2 | Absence |
| Example 9 | On-wall | 30 | 1 | 68 | 86 | 6 | 0.17 | 66 | 1.3 | Absence |

*1 Light-off performance (1): Times (sec) required to reach 550° C.
*2 Light-off performance (2): Temperature Difference (° C.) from Comparative Example 1

(Mass after HVT (%))

HVT is a heat vibration test. The mass after HVT is an evaluation of giving vibration in direction of the flow path of exhaust gas while flowing hot combustion gases through the catalyst loaded honeycomb structure, and it is confirmed that there is no mass change due to catalyst peeling before and after the test. In the evaluation of mass after HVT, if the mass difference is 1% or less before and after the test, it is considered acceptable.

(Presence or Absence of Catalyst Peeling)

First, the catalyst-loaded honeycomb structure of each Example is blown with air of 0.2 MPaG to remove the catalyst which is not fixed to the honeycomb structure. Next, the mass of the catalyst-loaded honeycomb structure after air blowing is measured. The measured mass is defined as "initial mass W1". Next, the beaker is charged with pure water to such an extent that the catalyst-loaded honeycomb structure is sufficiently immersed, and the catalyst-loaded honeycomb structure after air blowing is gently installed in the beaker. The beaker is placed in an ultrasonic cleaner and the catalyst-loaded honeycomb structure in the beaker is vibrated for 30 minutes at an oscillating frequency of 38 to 45 KHz. Next, the catalyst-loaded honeycomb structure is removed from the ultrasonic cleaner, and allowed to move up and down for 10 seconds in a beaker containing pure Examples 2~9

In Examples 2 to 9, the honeycomb structures were manufactured in the same manner as in Example 1 except that the raw materials and die were changed with respect to Example 1.

Specifically, in Example 2, the thickness of the partition wall was changed from 0.114 mm to 0.089 mm.

In Example 3, the thickness of the partition wall was changed from 0.114 mm to 0.132 mm.

In Example 4, the porosity was changed to 50%.

In Example 5, the porosity was changed to 47%.

In Example 6, the thickness of the partition wall was changed from 0.114 mm to 0.064 mm.

In Example 7, the porosity was changed to 47%.

In Example 8, the porosity was changed to 45%.

In Example 9, the porosity was changed to 50%.

Comparative Examples 1 to 2

In Comparative Examples 1 to 2, the honeycomb structures were manufactured in the same manner as in Example 1 except that the recipes of pore former and the like were changed with respect to Example 1. Specifically, in Comparative Example 1, the particle diameter of pore former was changed to 5 μm. In Comparative Example 2, the particle diameter of pore former was changed to 20 μm.

The honeycomb structures of Examples 2 to 9 and Comparative Examples 1 to 2 were also measured for the properties shown in the respective columns of Table 1 in the same manner as in Example 1. Table 1 shows the results.

The honeycomb structures of Examples 2 to 9 and Comparative Examples 1 to 2 were loaded the catalyst in the same manner as in Example 1, and the measurement and the evaluation of the properties shown in the respective columns of Table 2 were performed. The results are shown in Table 2.

(Results)

The honeycomb structures of Examples 1 to 9 obtained good results in the respective evaluations, as shown in Table 2. On the other hand, in the honeycomb structure of Comparative Example 1, catalyst peeling was confirmed in the evaluation of presence or absence of catalyst peeling. The honeycomb structure of Comparative Example 2 did not satisfy the acceptability criterion in the evaluation of the HC purification performance.

INDUSTRIAL APPLICABILITY

The honeycomb structure of the present invention can be utilized as a catalyst carrier for loading a catalyst for exhaust gas purification.

DESCRIPTION OF REFERENCE NUMERALS

1: partition wall, 2: cell, 3: circumferential wall, 4: honeycomb structure body, 11: first end face, 12: second end face, 100: honeycomb structure

What is claimed is:

1. A honeycomb structure comprising: a pillar-shaped honeycomb structure body having a porous partition wall defining a plurality of cells serving as fluid through channels extending from a first end face to a second end face, and having a circumferential wall disposed so as to encompass the circumference of the partition wall, wherein
   a thickness of the partition wall is 50 to 132 μm,
   a porosity of the partition wall is 40 to 55%,
   an open frontal area of pores on the surface of the partition wall per unit surface area of the partition wall is 10 to 15%, and
   a percentage ($S_{0\sim10}/S_{all} \times 100\%$) of the ratio of an opening area $S_{0\sim10}$ of the pores having an opening diameter of 10 μm or less to a total opening area $S_{all}$ of the pores opened to the surface of the partition wall is 90% or more.

2. The honeycomb structure according to claim 1, wherein the percentage ($S_{0\sim10}/S_{all} \times 100\%$) of the ratio of the opening area $S_{0\sim10}$ of the pores having the opening diameter of 10 μm or less to the total opening area $S_{all}$ of the pores opened to the surface of the partition wall is 94% or more.

3. The honeycomb structure according to claim 1, wherein the percentage ($S_{10\sim20}/S_{all} \times 100\%$) of the ratio of the opening area $S_{10\sim20}$ of the pores having the opening diameter of more than 10 μm and 20 μm or less to the total opening area $S_{all}$ of the pores opened to the surface of the partition wall is 6% or less.

4. The honeycomb structure according to claim 1, wherein the percentage ($S_{20\sim MAX}/S_{all} \times 100\%$) of the ratio of the opening area $S_{20\sim MAX}$ of the pores having the opening diameter of more than 20 μm to the total opening area $S_{all}$ of the pores opened to the surface of the partition wall is less than 1%.

5. The honeycomb structure according to claim 1, which is a catalyst carrier for loading an oxidation catalyst or a three-way catalyst for exhaust gas purification on the pores of the partition wall.

6. The honeycomb structure according to claim 1, wherein the oxidation catalyst or the three-way catalyst for exhaust gas purification is loaded on the pores of the partition wall, and a filling ratio of the catalyst on the pores is 20 to 35%.

7. The honeycomb structure according to claim 1, which is a catalyst carrier for loading a selective catalytic reduction catalyst for exhaust gas purification on the pores of the partition wall.

8. The honeycomb structure according to claim 1, wherein the selective catalytic reduction catalyst for exhaust gas purification is loaded on the pores of the partition wall, and a filling ratio of the catalyst on the pores is 20 to 35%.

* * * * *